United States Patent
Nebel et al.

(10) Patent No.: US 10,876,882 B1
(45) Date of Patent: Dec. 29, 2020

(54) ONLINE GRADE SELECTION FOR WEIGHT MEASUREMENTS OF COMPOSITE SHEETS

(71) Applicant: HONEYWELL INTERNATIONAL INC., Morris Plains, NJ (US)

(72) Inventors: Tobias Nebel, North Vancouver (CA); Sebastien Tixier, North Vancouver (CA); Michael Kon Yew Hughes, Vancouver (CA); Paul Mounter, Vancouver (CA)

(73) Assignee: Honeywell International Inc., Charlotte, NC (US)

( * ) Notice: Subject to any disclaimer, the term of this patent is extended or adjusted under 35 U.S.C. 154(b) by 36 days.

(21) Appl. No.: 16/453,588

(22) Filed: Jun. 26, 2019

(51) Int. Cl.
*G01N 9/36* (2006.01)
*G01B 11/06* (2006.01)
*G01G 17/02* (2006.01)
*G01G 9/00* (2006.01)

(52) U.S. Cl.
CPC ........... *G01G 9/00* (2013.01); *G01B 11/0691* (2013.01); *G01G 17/02* (2013.01); *G01N 9/36* (2013.01)

(58) Field of Classification Search
CPC ...... G01G 9/00; G01G 17/02; G01B 11/0691; G01N 9/36
USPC .......................................................... 177/1
See application file for complete search history.

(56) References Cited

U.S. PATENT DOCUMENTS

| 5,437,192 A * | 8/1995 | Kawamoto .......... G01N 33/346 73/159 |
| 6,092,419 A * | 7/2000 | Dixon ................ G01B 11/0666 250/231.1 |
| 7,352,194 B1 * | 4/2008 | Fuente Souviron ... G01B 7/105 324/230 |
| 7,399,971 B2 | 7/2008 | Hofman et al. |
| 2009/0179155 A1* | 7/2009 | Weinberg .................. G01T 1/24 250/370.01 |
| 2020/0096380 A1* | 3/2020 | Nebel .................... G01N 23/00 |

* cited by examiner

*Primary Examiner* — Jacques M Saint Surin

(57) ABSTRACT

A measurement apparatus includes a first sensor, scanner head, and computing device coupled to the first sensor that stores relative signal level ranges at selected spectral marker region(s) compared to a common region each corresponding to a composite sheet material grade and an associated sensor calibration. The computing device measures a first signal in the spectral marker region and a second signal in the common region of a composite sheet including a sheet material and a high-z material, determining a current relative signal level comparing a current signal level of the first and second signal, and identifying a current composite sheet material grade for the composite sheet from the composite material grades using the current relative signal level. Based on the current composite material grade a current sensor calibration is chosen from the sensor calibrations, and ≥1 physical parameter for the composite sheet is determined from the current sensor calibration.

17 Claims, 4 Drawing Sheets

ONLINE GRADE SELECTION FOR WEIGHT MEASUREMENTS OF COMPOSITE SHEETS

FIELD

Disclosed embodiments relate to online sheet material weight measurement.

BACKGROUND

Ceramic-coated polyethylene (PE) or polypropylene (PP) separator membranes are important components for the performance of lithium-ion batteries (LiBs). The separator-membrane provides an ion-permeable barrier between the cathode and the anode. The separator membranes are generally porous, and if uncoated generally start to degrade at temperatures of around 120° C. causing the LiB to short-circuit and thus fail. A ceramic-containing coating (e.g. aluminum oxide or $Al_2O_3$) applied to the separator membrane is known to help to improve the separator membrane's temperature-stability up to about 200° C.

For controlling the processing of sheet materials that have a coating thereon or have embedded particles therein, such as aluminum oxide for the processing of separator membranes by LiB separator manufacturers, weight measurements comprising the coating weight as well as the weight of the sheet material base layer (separator membranes e.g., comprising PE or PP) are both generally measured for process control. Several different approaches are known to acquire both of these weights.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize conventional measurement approaches for acquiring the coating weight as well as the weight of the sheet material also referred to as the 'base layer' for composite sheet samples that include 2 or more components (e.g. comprising a LiB separator membranes having a high-z comprising material coating on a polymer sheet) may be faced with measuring two or more different composite sheet material grades instead while online without the prior knowledge of which composite sheet material grade is present at the particular measurement time. As used herein, 'online' means while in production during fabrication using processing equipment typically as the composite sheet is moving, not in the laboratory. This composite sheet material grade uncertainty may result in inaccurate weight measurements for the sheet material, the coating, and the high-z material weight which is above besides being in the coating may be included within the sheet material, and/or the sheet material weight, because different calibrations are generally needed for accurate weight measurements of these parameters. A typical calibration is for calibrating the detected signal levels to the sheet material weight as well as to the high-z material weight.

Accordingly, an online method of composite sheet material grade selection is needed to improve the measurement accuracy for the coating weight, high-z material weight, and the weight of the sheet material, that enables better controlling of the online processing of composite sheets, such as ceramic coated LiB separators. The sheet material may also include an optional binder that binds the high-z coating to the sheet material. It is possible that variations in the production process (e.g., contamination in the production process or a change in the binder supplier resulting in a different binder composition) that are outside the control of the composite sheet manufacturer can lead to differences in the infrared (IR)-transmission spectrum as well as the x-ray transmission spectrum of composite materials.

Typically, the term 'grade' as used herein refers to a composite sheet with a known material composition, where one or more (usually one or two) composite materials vary in weight and are monitored for the purpose of process control. For each composite sheet material grade, a calibration between the measurement signal level and varying parameters (such as composite area weight/thickness/density) is generally developed prior to production ('offline'). This is typically performed by exposing composite sheet samples of this grade with known varying composite material to the measurement, and then recording the measurement signal level resulting in a relationship between the signal level and the varying parameter. Often, this resulting calibration curve is non-linear, indication a more complicated relationship between the varying parameter (such as composite material area weight/thickness/density) and the signal level.

In order to obtain accurate measurements for the varying parameter (such as composite material area weight/thickness/density), the correct composite sheet material grade and with it the correct calibration curve needs to be selected at the beginning of the 'online' composite sheet production process. This is conventionally performed in a manual step, where, for instance, the machine operator picks the appropriate composite sheet material grade according to the composite sheet material composition believed to be present at a particular time.

Disclosed aspects provide an automated composite sheet material grade selection, and solve the problem when a manual composite sheet material grade selection is unwanted or is not possible, such as due to missing information on materials and composition. Also, the composite sheet production process might experience hidden anomalies or be subject to unknown contamination, both of which can affect composite sheet material grade selection.

Disclosed aspects include a method of online grade selection for improved accuracy of composite sheet material weight measurements that automatically uses at least one differentiating spectral marker (e.g., a peak within an infrared (IR)-spectrum) that can be identified online (during composite sheet material production) which is used to automatically distinguish between a plurality of different composite sheet material grades, where the respective composite sheet material grades each have different stored calibration(s). The spectral marker enables selecting an appropriate calibration(s) from a plurality of different stored calibrations each for a different composite sheet material grade, which helps improve the accuracy of the online weight measurements for the composite sheet.

One disclosed embodiment comprises a measurement apparatus that includes at least a first sensor, a scanner head, and computing device coupled to the first sensor that stores relative signal level ranges at selected spectral marker region(s) compared to a common region, each corresponding to a composite sheet material grade and an associated sensor calibration. The computing device measures a first signal in the spectral marker region and a second signal in the common region of a composite sheet including a sheet material base layer (sheet material) and a high-z material, determining a current relative signal level comparing a current signal level of the first and second signal, and identifies a current composite sheet material grade for the composite sheet from the composite material grades using the current relative signal level. Based on the current composite material grade a current sensor calibration is chosen from the sensor calibrations, and at least one physical parameter for the composite sheet is determined from the current sensor calibration. The physical parameter can comprise at least one of a weight per unit area, a thickness, or a density of the high-z material, or a weight per unit area, a thickness, or a density of the sheet material.

BRIEF DESCRIPTION OF THE DRAWINGS

FIG. 3A and FIG. 3B, is shown in FIG. 3B affected by an interferent.

DETAILED DESCRIPTION

Figure 1:
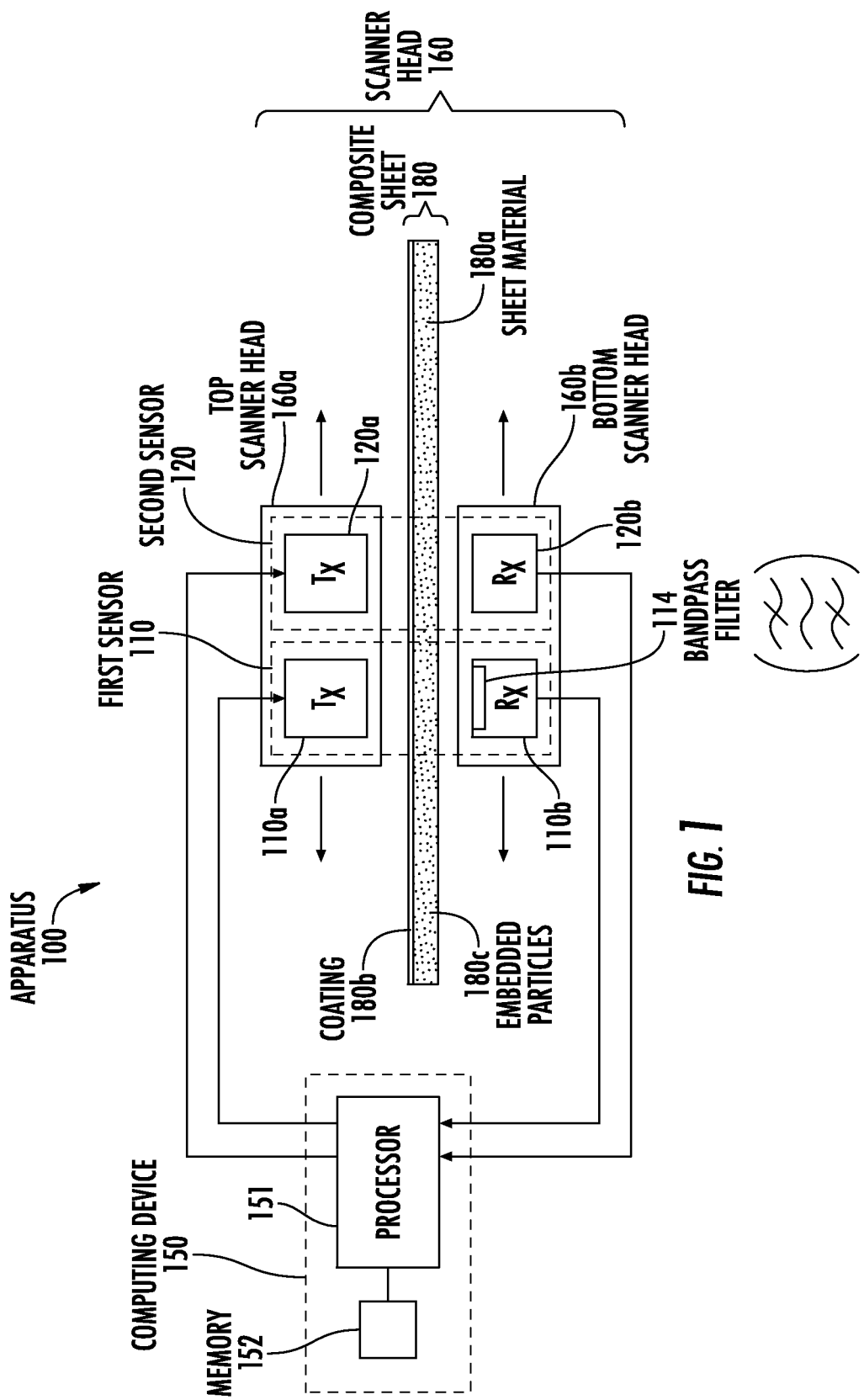
FIG. 1 is a depiction of an example measurement apparatus including a first sensor and an optional second sensor shown as a transmissive sensor for weight measurements of a composite sheet that can benefit from disclosed methods of online sheet material grade selection, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

FIG. 1 is a depiction of an example weight measurement apparatus (apparatus) 100 including a first sensor 110 and a second sensor 120 for weight measurements of a composite sheet 180 that can benefit from disclosed methods. Disclosed composite sheet material grade-based calibration claim only needs one sensor, shown as the first sensor 110, generally operating in the visible and/or IR spectrum. The second sensor 120 is generally needed for specific weight measurement applications, such as measuring the weights of two components of a composite sheet, such as the weight per unit area of the base sheet and the weight per unit area of the coating. The apparatus 100 is configured to online measure the composite sheet 180 that comprises a high-z comprising material coating (coating) 180b on a sheet material 180a that functions as a base-layer or high-z particles embedded in the sheet material 180a, where the coating 180b and the embedded particles 180c and are both shown in FIG. 1 for the composite sheet 180.

High-z is defined herein as atoms that have an atomic number at least equal to ($\geq$) the atomic number of aluminum which has an atomic number of 13. One example high-z comprising material is $Al_2O_3$ (aluminum oxide) which may be in the form of a coating 180b on a sheet material 180a that generally comprises a dielectric polymer such as PE, PP, or multilayer sheets thereof. The dielectric polymer may also have embedded high-z particles therein.

For the composite sheet 180, the measurement apparatus 100 can determine both a high-z comprising material weight per unit area, such as of the coating 180b or the embedded particles 180c shown in FIG. 1, and the total weight (per unit area) of the sheet material 180a. A scanner head 160 includes a top scanner head 160a and a bottom scanner head 160b. Each scanner head 160a, 160b has a transmitter (Tx) or a receiver (Rx) of each of the two sensors 110 and 120 therein, shown in FIG. 1 with a Tx 110a and Tx 120a shown in the top scanner head 160a and an Rx 110b and an Rx 120b shown in the bottom scanner head 160b.

The Rx 110b of the first sensor 110 is shown including a bandpass filters 114 that generally comprises a plurality of independently selectable multiple bandpass filters 114 having different passbands for selectively passing radiation in at least one marker region or reference region. The bandpass filter(s) 114 can be setup in a beam splitter arrangement with the light paths going to different detectors. Instead, the bandpass filter(s) 114 can be mounted in the Tx 110a in a rotating filter wheel that sends the various wavelengths of light to the composite sheet 180 sequentially. In this case, the transmitted light is measured by one detector mounted in Rx 110b.

Other methods known in the art for measuring visible/IR absorption can be utilized. For example, the Rx 110b can include a visible/IR spectrometer such as a grating spectrometer. The scanner head 160 is used to scan the first and second sensors 110, 120 over the composite sheet 180, such as after the coating 180b has been applied to the sheet material 180a. The sheet material 180a is generally an essentially flat (planar) sheet.

A computing device 150 comprising a processor 151 having an associated memory 152 is included with the weight measurement apparatus 100. A plurality of different signal level ranges associated with the selected spectral maker(s) each corresponding to different composite sheet material grades may be stored in the memory 152.

In the first sensor 110 having at least one bandpass filter 114, a polymer measure filter can be chosen so that its central wavelength is at or close to an absorption peak of the polymer contained in the sheet material 180a. The bandpass filter 114 can also provide a reference filter for a common region, that may be selected to measure a region that is mostly insensitive to material comprising the composite sheet 180. The signals at the polymer measure and the reference wavelengths can be combined by the computing device 150 to provide a measurement of the areal weight of the polymer component of the sheet material 180a.

In one embodiment, the areal weight of the coating 180b or the embedded particles 180c is determined by using an additional bandpass filter 114 that has a passband centered at a spectral region sensitive to the material of the coating 180b or the embedded particles 180c. In this case, the second sensor 120 is not needed.

In another embodiment, the areal weight of the coating 180b or the embedded particles 180c is determined by the second sensor 120 which can be one of a few different sensor types. For example, the second sensor 120 can comprise an x-ray sensor for measuring transmitted x-rays, where the x-ray absorption is proportional to the atomic number (z), and is therefore most sensitive to high-z materials.

In both embodiments described above, the absorption feature used to determine the polymer weight of the sheet material 180a which can be degraded by the presence of the high-z comprising coating 180b or embedded particles 180c. For example, absorption features from the coating 180b or the embedded particles 180c can overlap with the polymer peak. This might stem from the presence of specific binders in the coating 180b. Due to this interference, different calibration parameters may be needed to accurately measure the coating 180b and/or the sheet material 180a areal weights.

An automated composite sheet material grade-selection is also disclosed. By detecting the presence or the absence of one or more interferents (see FIGS. 3A and 3B described below), an appropriate set of calibration parameters can be automatically loaded and used by the computing device 150 to provide a more accurate measure of the coating 180b and/or the sheet material 180a areal weights. An additional bandpass filter 114 being an interferent or marker filter, can be selected at wavelengths mostly sensitive to the interferent or marker and mostly insensitive to the sheet material 180a. This signal alone or this signal combined with the reference signal and/or the polymer measure signal can be used by the computing device 150 to select the proper calibration parameters from at least 2 sets of calibration parameters.

The switching of the calibration set used can occur while the measurement head is scanning. Typically, the calibration parameters have previously been obtained offline by shooting samples with known properties in the IR gauge. Samples properties include sheet material and coating composition well as coating and sheet material areal weights measured by standard laboratory techniques. In one embodiment, a multitude of calibration sets is obtained as a function of the concentration of the interferent. The strength of the interferent signal can be used to select the appropriate calibration set.

In one embodiment the coating 180b or the embedded particles 180c areal weight is also determined by the first sensor 110 comprising an IR sensor and the measurement is affected by the interferent. The disclosed method is used to improve the measurement accuracy of the coating 180b or the embedded particles 180c areal weight in a similar way as for the sheet material measurement.

Although the processor 151 of computing device 150 generally implements algorithms stored in the memory 152, as known in the art, algorithms such as disclosed algorithms may be implemented by hardware or be implemented by software. Regarding hardware-based implementations, algorithm equations can be converted into a digital logic gate pattern, such as using VHDL (a Hardware Description Language) that can then be realized using a programmable device such as a field-programmable gate array (FPGA) or a dedicated application-specific integrated circuit (ASIC) to implement the needed logic gate pattern shown as hardware including digital logic. Regarding software-based algorithm implementations algorithm code stored in the memory 152 can be implemented by the processor 151.

In one arrangement the second sensor 120 extracts information to enable the computing device 150 to determine the high-z weight of the coating 180b and/or embedded particles 180c if present, which as described above may be a high-z ceramic material. The second sensor 120 can comprise a few different sensor types, including an x-ray sensor for measuring transmitted x-rays, where the x-ray absorption is proportional to the atomic number (z) and is therefore most sensitive to high-z materials. This second sensor's 120 measurement can be used by the computing device 150 to provide a direct measurement of the absolute high-z weight per unit area of the coating 180b or the embedded particles 180c. Specifically, in the case of an x-ray sensor, the x-ray measurement is generally about 10 times more sensitive to the coating 180b weight as compared to the weight of the sheet material 180a which is generally a plastic membrane. The sheet material 180a weight in this case can then be determined by subtraction of the two measured weights (the total weight of the composite sheet 180 minus the weight of the coating 180b). This equation if there are only embedded particles 180c instead of the coating 180b becomes the total weight of the composite sheet 180 minus the weight of the embedded particles 180c.

Figure 2:
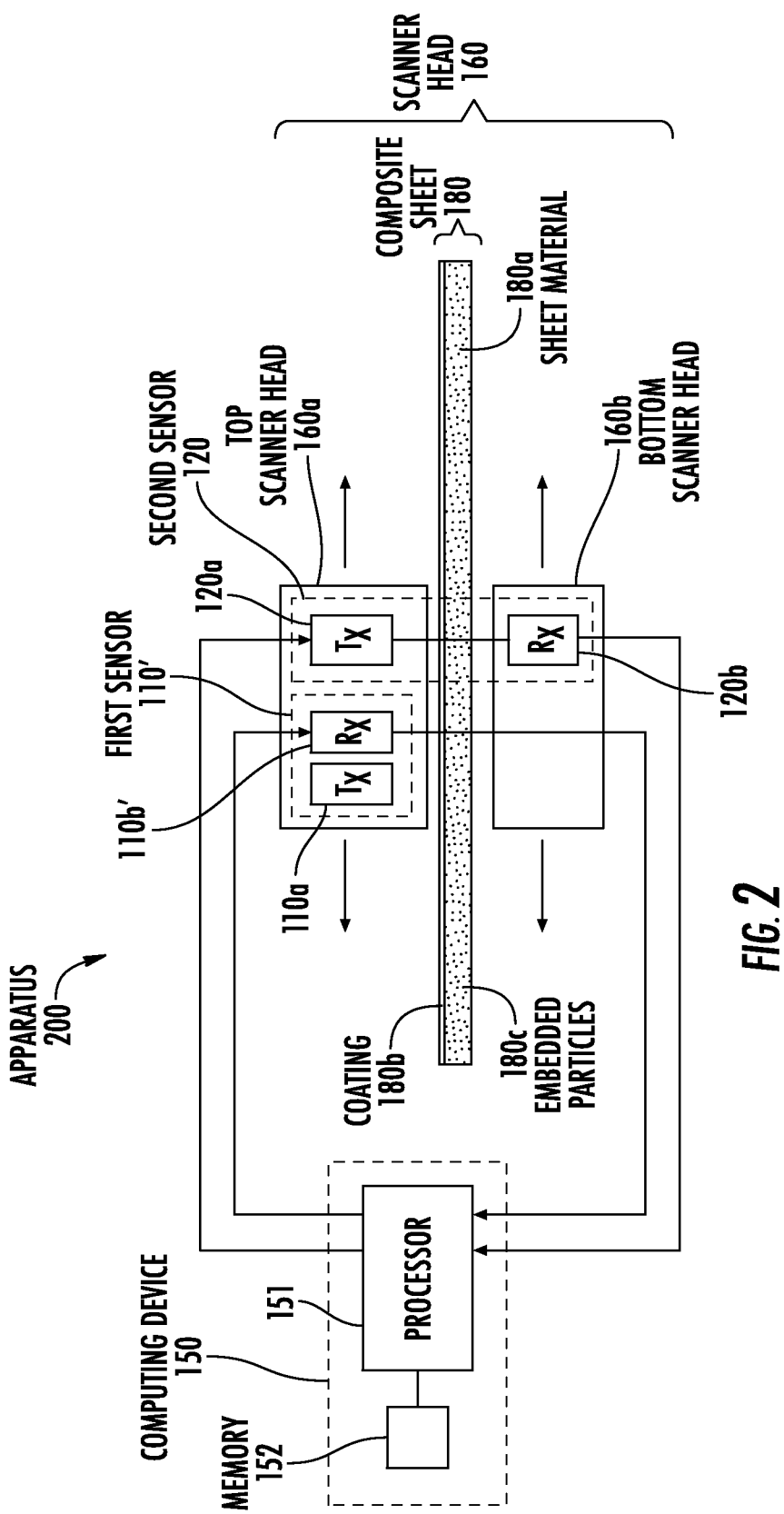
FIG. 2 is a depiction of an example measurement apparatus including a first sensor shown as a reflective sensor, and a second sensor for weight measurements of a composite sheet that can benefit from disclosed methods of online sheet material grade selection, according to another example embodiment.

The composite sheet 180 can comprise a coated separator sheet for a LIB. The first sensor 110 and second sensor 120 are both shown in FIG. 1 as transmission sensors and therefore have upper and lower halves, 110 and 110b, and 120a and 120b, respectively. An IR sensor can alternatively be reflection-based sensor such as shown in FIG. 2 described below. However, an x-ray sensor as the second sensor 120 is always generally a transmission sensor.

As described above, the composite sheet 180 can comprise a high-z material coating 180b on a flat polymer sheet, and/or the high-z material can be embedded as embedded particles 180c in the sheet material 180a. The high-z material can be a ceramic (e.g., $Al_2O_3$, $SiO_2$ or $ZrO_2$) coating, and both the high-z material and the sheet material 180a can be porous. The sheet material 180a can be polymer or layers of polymers (e.g., PE, or PP). While for LIB's ceramic particles are generally applied as either single-sided or double-sided coatings (embedded in binders), as noted above this Disclosure can be used for weight measurements where the composite sheet 180 only includes inclusion of these ceramic particles within the sheet material 180a itself.

FIG. 2 is depiction of an example measurement apparatus 200 including a first sensor 110' shown as a reflective sensor, and a second sensor 120 for weight measurements of a composite sheet that can benefit from disclosed methods of online grade selection. The first sensor comprises a Tx 110a and a Rx 110b' both located in the top scanner head 160a. The first sensor 110 can also be located in the bottom sensor head 160b.

Figure 3A:
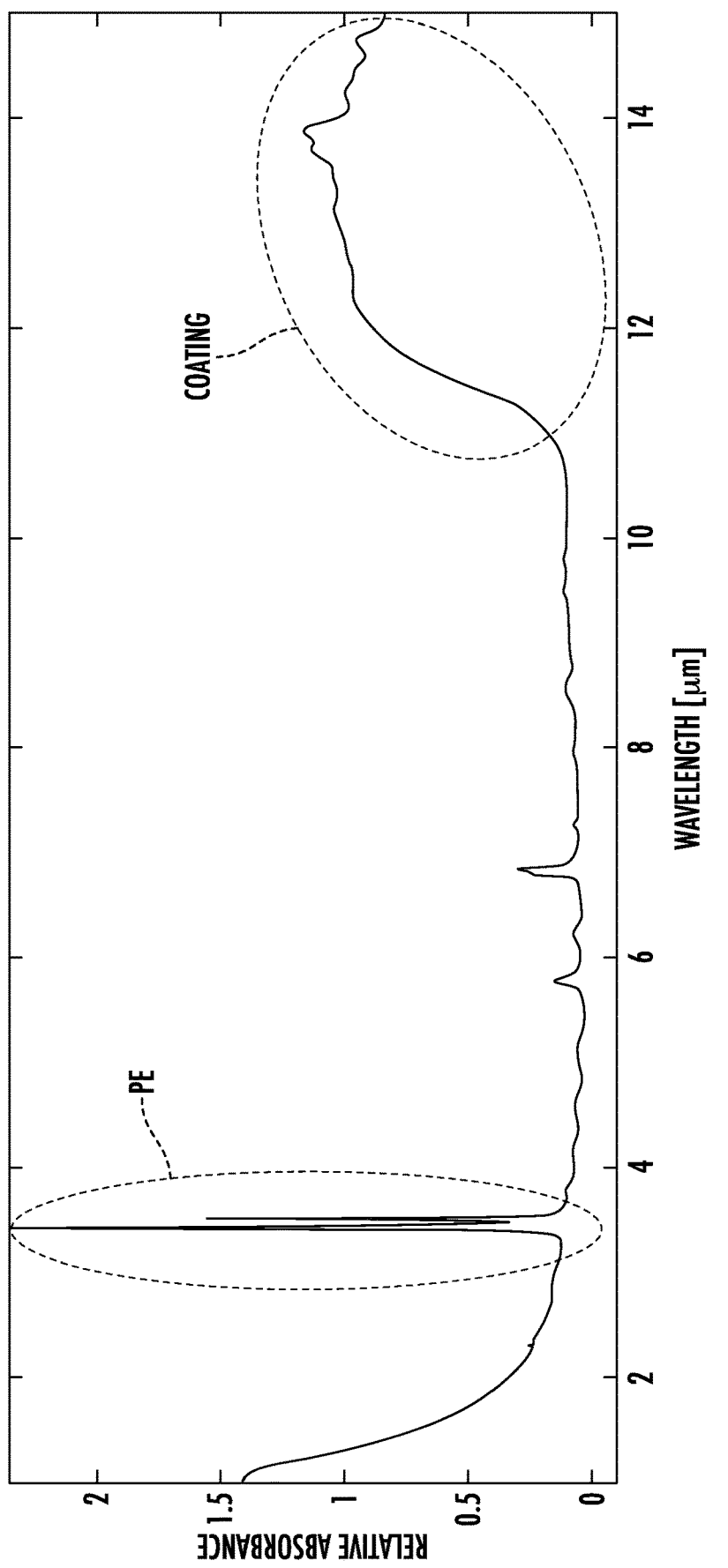
FIG. 3A and FIG. 3B show example Fourier transform IR (FTIR) spectra for composite sheet materials having coatings thereon evidencing additional absorption features shown in FIG. 3B shown as a 'marker', according to an example embodiment. One spectral region at about 3.4 microns for polyethylene (PE) in both
Figure 3B:
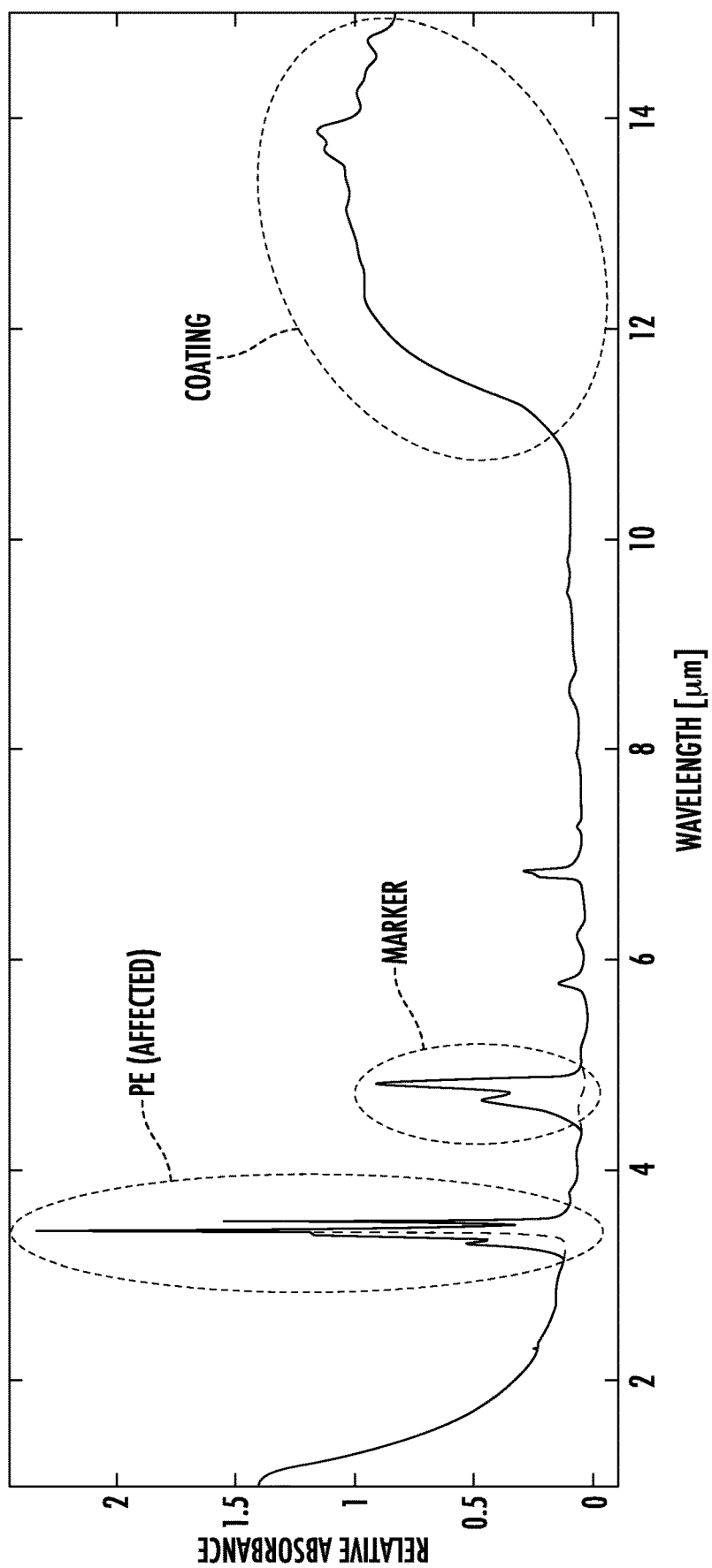

Disclosed methods of online composite sheets weight measurements generally utilize IR data from as many different composite sheet samples as possible. The spectral data is recorded where the transmission path can follow a single path or multiple passes through the composite sheet 180, for example to obtain Fourier Transform IR (FTIR) spectral data from 1 μm to 20 μm, such as shown in FIG. 3A for composite sheets. FTIR generally comprises passing the received light through a Michelson interferometer with a varying optical path difference such that the spectrum can be computed by taking the FT of the signal. Absorption features for the PE-based material and for the ceramic-containing coating are observed. FIG. 3B shows a spectrum for a similar product. The PE absorption peaks at around 3.4 μm is affected by an interferent and an additional absorption peak at around 4.5 μm is measured as shown in FIG. 3B. This absorption feature, the marker, and the interferent can be due to, for example, to absorption from a binder material and/or from other additives present in the coating 180b.

A common region (which can be the reference region) and a grade-specific maker region(s) are both identified. The region identification can be performed manually, or can be performed automatically by software. In practice, a manual marker identification can be used when a distinct absorption feature exists as shown in FIG. 3B. In more complex cases and with sufficient sample data, a machine learning technique such as using a classification algorithm, Principal Component Analysis (PCA) or a shallow neural network can be used to group together the respective composite sheets into the various composite sheet grades and provide a marker region(s) for grade identification.

The marker region(s) and the optional common region(s) are monitored (e.g. by applying bandpass filters to an IR gauge for all measurements) during online composite sheet measurements. An appropriate calibration curve belonging to the composite sheet material grade is loaded and used by the computing device for areal weight calculations. The calibration curve which may be non-linear establishes the relationship between detector signal level and the sheet material and coating areal weight.

Disclosed methods may be applied to a continuous production process, a batch production process, automatically during the online measurements and before any weight is calculated from the online weight measurement from the sensor data. As a result, known process anomalies and contamination that are known to appear in the manufacturing process at random times for composite sheets can be accounted for. Such contamination can otherwise alter the spectral markers and falsely contribute to the marker region signal rendering it inaccurate. Applying a grade-specific calibration will improve the accuracy of material weights of the sheet material manufacturing process.

Disclosed methods apply to coating weight measurements, to basis-weight measurements, and generally to all measurements for composite sheets involving an IR sensor. Any online composite sheet manufacturing process that has known unknowns including contaminations, fillers, or impurities may show symptoms of altered IR absorption spectra as described above. If an IR sensor is used to measure physical properties of a composite sheet (e.g. at least one weight) then this same IR sensor can also be used as a composite sheet material grade classification device.

One disclosed embodiment makes use of machine learning-based grade classification algorithms. Machine learning-based grade classification algorithms can increase the accuracy of the composite sheet material grade classification procedure described herein.

EXAMPLES

Disclosed embodiments are further illustrated by the following specific Examples, which should not be construed as limiting the scope or content of this Disclosure in any way.

In the case of LiB separator production where a ceramic-containing coating (for example $Al_2O_3$) is applied onto at least one side of a PE or PP sheet or multilayer combinations thereof, one spectral marker region can be the double-peak structure observed at around 4.5 µm as shown in FIG. 3B. The presence or absence of this double-peak spectral marker region feature can be used to distinguish between the two or more different composite sheet material grades.

Other spectral marker regions are possible, which depend on the specific IR absorption properties of the coating-related material(s). A common region, for example around 4 µm between a peak for the sheet material and the spectral marker, or beyond the special marker region, that has essentially no sheet material grade dependent signal can be used to establish a common region (or reference level) to provide normalization of the signal levels. Once the composite sheet material grade is determined, disclosed methods allows the automatic choosing of appropriate calibration data, generally previously established offline, such as established in a laboratory. The online measurement (for instance comprising an IR-measurement, an x-ray measurement, a nuclear measurement (beta radiation) or any combination thereof) will then reveal correct values for the parameters under investigation such as thickness, area weight, and density of the high-z material and/or of the sheet material base layer.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method, comprising:
   measuring a first signal representative of an intensity in a spectral marker region within a selected spectral range and a second signal representative of an intensity in a common region within the selected spectral range from a measurement apparatus comprising at least a first sensor including a transmitter and a receiver of a composite sheet comprising a sheet material base layer and a high-z material in at least one of a coating on the sheet material base layer or as embedded particles within the sheet material base layer, wherein the measuring is performed while the composite sheet is online;
   determining a relative signal level that compares a signal level of the first signal to a signal level of the second signal;
   identifying a current composite sheet material grade for the composite sheet selected from a plurality of different composite sheet material grades using the relative signal level;
   based on the current composite sheet material grade automatically choosing a current sensor calibration from a plurality of different sensor calibrations, and
   determining at least one physical parameter for the composite sheet using the current sensor calibration.

2. The method of claim 1, wherein the physical parameter comprises at least one of a weight per unit area, a thickness, or a density of the high-z material, or a weight per unit area, a thickness, or a density of the sheet material base layer.

3. The method of claim 1, wherein the selected spectral range is within a visible spectral range or within an infrared (IR) spectral range.

4. The method of claim 1, wherein the common region comprises a region in the selected spectral range between a peak for the sheet material base layer and the spectral marker region.

5. The method of claim 1, further comprising using a first bandpass filter for selectively passing radiation in the spectral marker region and a second bandpass filter for selectively passing radiation in the common region.

6. The method of claim 1, wherein the first sensor comprises an infrared (IR) or a visible light sensor, further comprising a second sensor comprising an x-ray sensor, wherein the physical parameter comprises a weight of the coating and a weight of the sheet material base layer.

7. The method of claim 1, further comprising generating the plurality of different composite sheet material grades, comprising:

recording infrared (IR) spectral data or visible spectral data from a plurality of samples of the composite sheet;

grouping together respective ones of the plurality of samples into the plurality of different composite sheet material grades by identifying at least one of the-spectral marker region in the respective IR or visible spectral data, and for each of the composite sheet material grades generating a ratio between an amplitude in their spectral marker-region with respect to an amplitude in the common region.

8. The method of claim 7, wherein the recording IR spectral data or visible spectra data comprises Fourier transform-derived IR data from 1 to 20 microns.

9. The method of claim 1, wherein the analyzing is performed entirely automatically.

10. The method of claim 9, wherein machine learning or a classification algorithm is used for the identifying.

11. A measurement apparatus, comprising:
at least a first sensor comprising a transmitter and a receiver, and
a scanner head for moving the first sensor;
a computing device coupled to receive data from the first sensor, the computing device comprising a processor having an associated memory that stores a plurality of different relative signal level ranges at one or more selected spectral marker regions compared to at least one common region both being within a selected spectral range, each of the different relative signal level ranges corresponding to a composite sheet material grade and an associated sensor calibration;
the computing device for automatically:
measuring a first signal representative of an intensity in the spectral marker region and a second signal representative of an intensity in the common region of a composite sheet comprising a sheet material base layer and a high-z material in at least one of a coating on the sheet material base layer or as embedded particles within the sheet material base layer;
determining a current relative signal level that compares a current signal level of the first signal to a current signal level of the second signal;
identifying a current composite sheet material grade for the composite sheet selected from the composite sheet material grades using the current relative signal level;
based on the current composite sheet material grade automatically choosing a current sensor calibration from the sensor calibrations, and
determining at least one physical parameter for the composite sheet using the current sensor calibration.

12. The measurement apparatus of claim 11, wherein the physical parameter comprises at least one of an area weight, a thickness, or a density of the high-z material, or an area weight, a thickness, or a density of the sheet material base layer.

13. The measurement apparatus of claim 11, wherein the selected spectral range is within a visible spectral range or within an infrared (IR) spectral range.

14. The measurement apparatus of claim 11, wherein the common region comprises a region in the selected spectral range between a peak for the sheet material base layer and the spectral marker region.

15. The measurement apparatus of claim 13, further comprising a first bandpass filter for selectively passing radiation in the spectral marker regions and a second bandpass filter for selectively passing radiation in the common region.

16. The measurement apparatus of claim 11, wherein the first sensor comprises an infrared (IR) or visible light sensor, further comprising a second sensor comprising x-ray sensor, wherein the physical parameter comprises a weight of both the coating and a weight of the sheet material base layer.

17. The measurement apparatus of claim 11, wherein machine learning or a classification algorithm is used for the identifying.

* * * * *